Aug. 5, 1958 G. B. CROFUTT, JR., ET AL 2,846,512

PARTY LINE STATION IDENTIFYING IMPULSE TRANSMITTER

Filed Dec. 31, 1956 3 Sheets-Sheet 1

INVENTORS: G. B. CROFUTT, JR.
J. B. FISK
BY
ATTORNEY

Aug. 5, 1958 G. B. CROFUTT, JR., ET AL 2,846,512

PARTY LINE STATION IDENTIFYING IMPULSE TRANSMITTER

Filed Dec. 31, 1956 3 Sheets-Sheet 2

INVENTORS: G.B.CROFUTT, JR.
J.B.FISK

BY [signature]

ATTORNEY

PARTY LINE STATION IDENTIFYING IMPULSE TRANSMITTER

Filed Dec. 31, 1956 3 Sheets-Sheet 3

INVENTORS: G. B. CROFUTT, JR.
J. B. FISK

BY

ATTORNEY

United States Patent Office 2,846,512

Patented Aug. 5, 1958

2,846,512

PARTY LINE STATION IDENTIFYING IMPULSE TRANSMITTER

George B. Crofutt, Jr., Verona, and James B. Fisk, New Vernon, N. J., assignors to Bell Telephone Laboratories, Incorporated, New York, N. Y., a corporation of New York Application December 31, 1956, Serial No. 631,752

12 Claims. (Cl. 179—81)

This invention relates to a telephone party line station identification system and more particularly to the subscriber's station apparatus of such a system.

An object of the present invention is to provide party line station identification which functions into a central office of the electronic type.

A more specific object of the invention is the automatic transmission of party line station identification pulses at a rate consistent with detection by central office electronic scanning equipment.

Another object of the invention is the transmission of party line station identification pulses by means readily adaptable for use with presently installed subscriber station apparatus.

Another object of the invention is the automatic transmission of party line station identification pulses by means independent from the subscriber's station dialing apparatus.

In a specific embodiment of the invention, described in more detail below for purposes of illustration, the features of the invention are employed in a party line station identification system which is integrated with the usual components found in a conventional subscriber's station subset.

In accordance with the principles of the invention, station identification is achieved by the transmission of pulses sent prior to the transmission of dialing pulses. The pulses are generated by means of a sealed dry reed switch or other suitable device which is placed in series with the subscriber's line. The switch is normally held operated by a permanent magnet, one of a series of magnets mounted radially on a pulsing wheel. The precise number of magnets employed is dependent on the number of pulses required to indicate the party that is calling. Removing the handset from the cradle allows the switchhook to effect line closure and unlatches the pulsing wheel which revolves past the sealed switch, alternately opening and closing the line until the pulsing wheel returns to its position of rest.

In one type of telephone electronic switching system, the subscriber lines are scanned periodically at the central office to determine whether the line is open or closed at the subset. For efficient supervision of the lines, i. e., early recognition of the start or the end of a call, the lines are scanned at fixed frequent intervals, for example, every 100 milliseconds. As soon as it is found that a call has started on a line, that line is scanned at a more rapid rate, for example every 5 milliseconds, for the purpose of detecting dial pulses. For the effective use of such a system, provisions must be made at the subset to insure a delay of at least 100 milliseconds between the initial line closure at the start of a call and the transmission of station identifying pulses. A delay of this nature insures that the start of a call on the line will be recognized by the circuits at the central office making the 100-millisecond supervision scan of the line. This recognition will in turn cause the scanning rate to be changed to 5 milliseconds for dial pulse detecting before the station identifying pulses are transmitted over the line.

Accordingly, a feature of the present invention is an arrangement that introduces a predetermined delay period between the initial line closure at the start of a call and the transmission of station identifying pulses.

An additional feature of the invention is an arrangement that insures the generation of station identifying pulses at a fixed rate consistent with their detection by central office high speed electronic scanning equipment.

A further feature of the invention is an arrangement providing for a time margin between the end of the transmission of party identification pulses and the beginning of the transmission of pulses representing the called station number.

A further feature of the invention is a mechanical delay or lost motion device that effects proper subset circuit alignment by switching means after the switchhook is released but before the transmission of station identifying pulses begins.

These and other objects and features of the invention will be more fully understood by considering the following detailed description in connection with the accompanying drawings in which.

Figure 1:
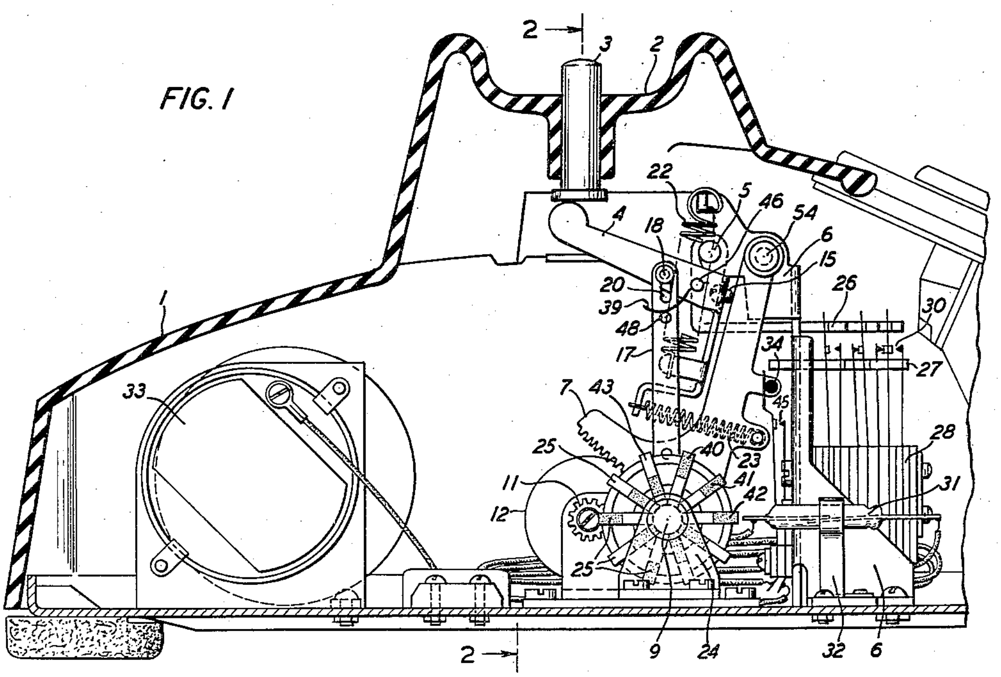
Fig. 1 is a side cross section view of a telephone subscriber's subset as a preferred embodiment of the invention.
Figure 2:
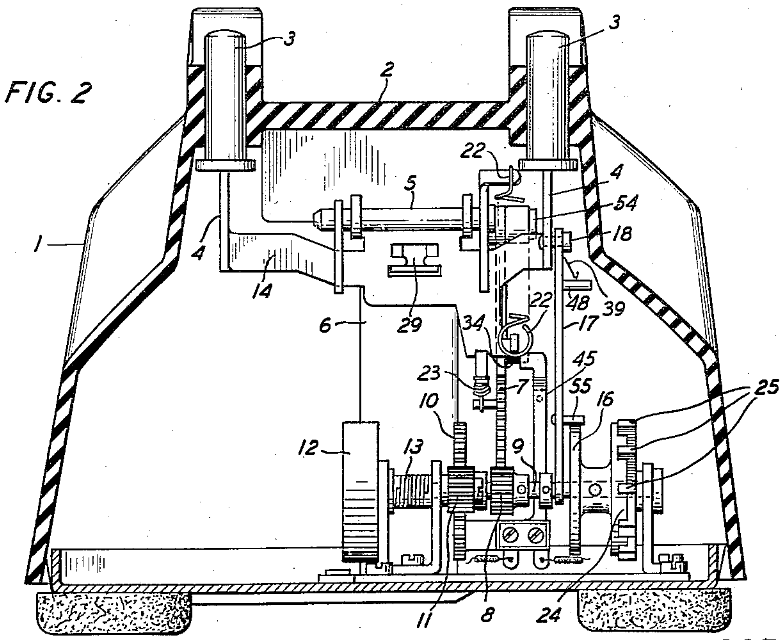
Fig. 2 is a front cross section of the subset shown in Fig. 1 taken along the line 2—2 and looking in the direction of the small arrows.
Figure 3:
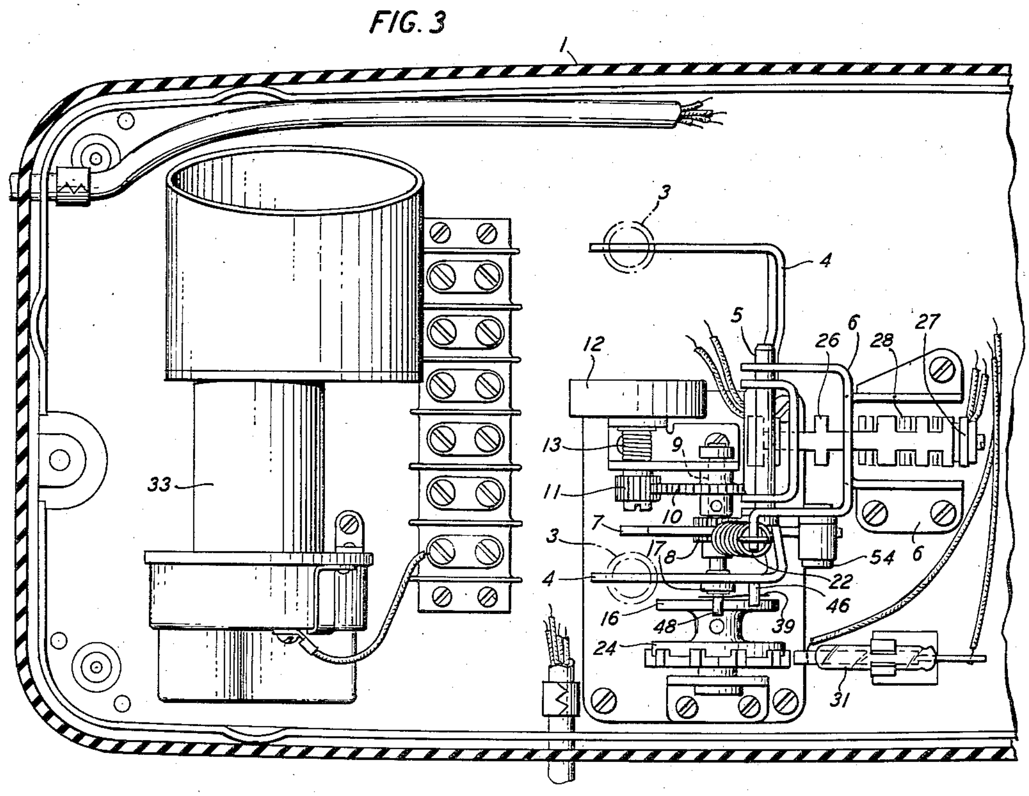
Fig. 3 is a plan view of the subset shown in Fig. 1.

Referring now to Figs. 1, 2, 3, 5 and 6 it will be noted that a conventional type subscriber's subset 1 adequately meets the space requirements of a party line station identifying pulse transmitter arrangement embodying the novel features of the invention. Following a complete cycle of operations, placing the telephone handset 35 in the cradle 2 of the subscriber's subset 1 depresses the two switchhook plungers 3 which in turn act against the arms of the switchhook 4. The switchhook is thus made to rotate about the switchhook cross shaft 5, which is supported by the bracket 6. With the movement of the switchhook 4, a small adjusting screw 15 is brought to bear against the swinging rack 7, axially mounted on the cross shaft 54, moving the rack 7 to the rear of the subset 1. The movement of the switchhook 4 extends spring 22 and the corresponding movement of the rack 7 compresses spring 23. During the period of the rack 7 swing, the gear teeth of the rack mesh with the pinion gear 8 thus causing the rotation of the shaft 9, together with members axially mounted on the shaft 9, including the latch cam 16, the pulsing wheel 24 and the governor drive gear 10. The governor drive gear 10 meshes with the governor spur gear 11 which, through a conventional spring clutch arrangement 13, operates a spring controlled centrifugal force friction governor 12. The governor serves no function during the sequence of operations taking place between the off-hook and on-hook positions and accordingly the clutch arrangement 13 is designed to slip during this movement so that driving force is not transmitted to the governor 12.

A slotted link 17 is joined to one of the switchhook arms 4 by means of a connecting pin 18. The slotted link is permitted a certain degree of substantially vertical motion by virtue of the elongated closed slot 20 in which the connecting pin 18 is free to ride. As the slotted link 17 moves downward in response to the downward movement of the switchhook 4, a projecting pin or cam follower 55 is brought to bear against the edge of the latch cam 16 and rides the edge of the cam until it drops into the cam slot 19, see Fig. 5, thus blocking further movement of the switchhook 4, the slotted link 17, the pulsing wheel 24 and the swinging rack 7. In addition to the natural gravitational force tending to drop the cam follower 55 into the cam slot 19, positive force is added by the action of the spring 39 bearing against the pin 48 projecting from the slotted link 17. The spring 39 at its opposite end is coiled around a pin 46 projecting from the switchhook 4. Throughout its travel, the slotted link 17 is maintained in a substantially vertical position by means of the open slot 21 at its lower end which is fitted over the cross shaft 9.

Figure 4:
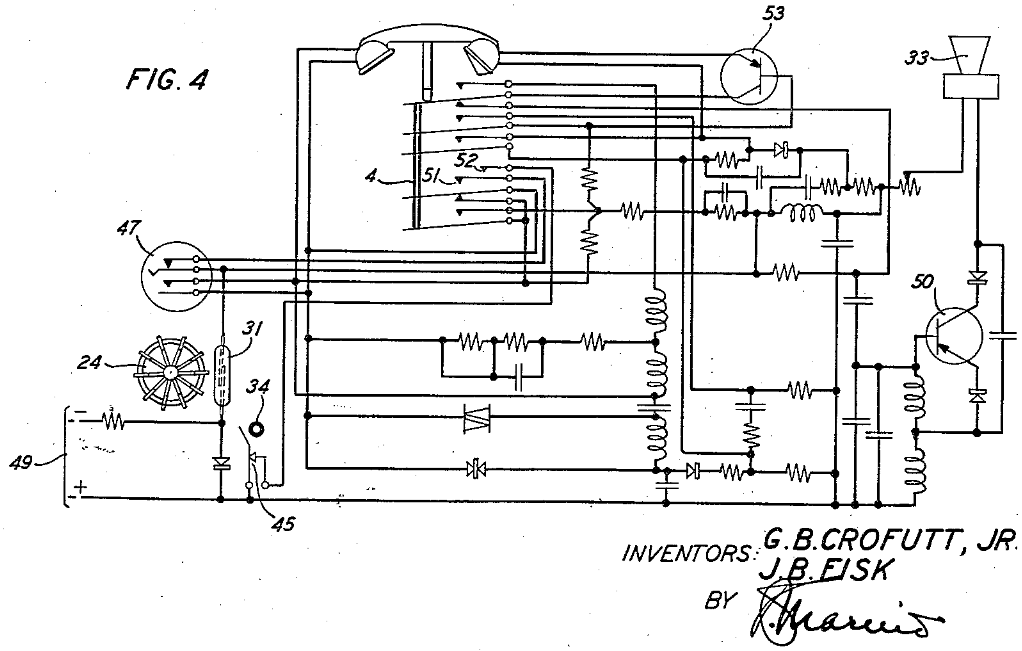
Fig. 4 is a schematic wiring diagram of a transistorized subset, of a type compatible with an electronic switching system, and shows the features of the invention embodied therein.
Figure 5:
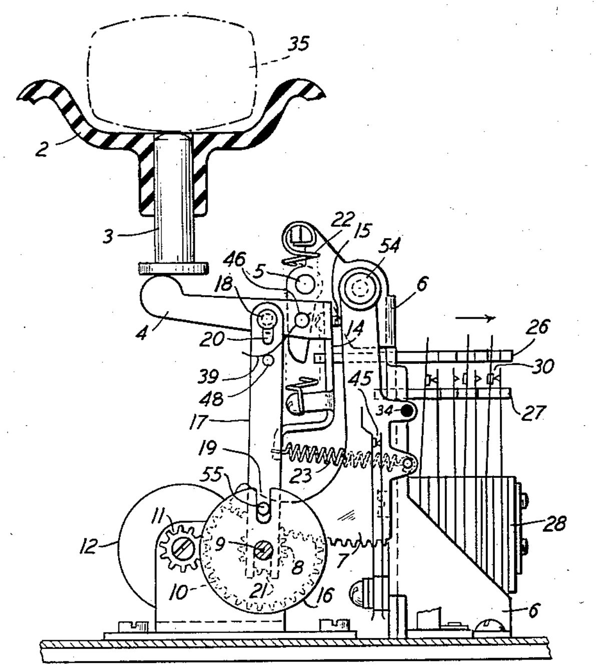
Fig. 5 is similar to Fig. 1 with the exception that the pulse transmitter is omitted in order to illustrate more clearly the position of the gears and linkages in the on-hook state.

Immediately after the start of the swing of the rack 7, which occurs when the handset is placed in the cradle, a projecting lug 34 on the rack 7 is withdrawn from one of the springs of the spring contact pair 45 allowing the previously open contacts to close, as shown in Fig. 5. This action, as will be noted by reference to Fig. 4, short-circuits the subset circuits by a path which extends from one side of the line through the party normal contacts 45, the spring contacts 51 and 52, the dial pulsing contacts 47 and the party pulsing contacts 31 to the other side of the line.

Certain subset circuit contacts controlling the dial signaling, ringing and talking circuits are operated directly from the force of the switchhook. These spring contacts 30 based in the spring pileup 28 are held in place by the fixed card 27, which is secured to the bracket 6, and by the movable card 26. The movable card 26 is held in place by being fitted into a suitably designed hole 29 in the switchhook yoke 14.

Conditions existing at the end of the downward travel of the switchhook are illustrated in Fig. 5 where the handset 35 is shown fully housed in the cradle 2. It will be noted at this point that the pulse wheel 24, if free to rotate, would do so as a result of the compression placed on the spring 23 and the tension on the spring 22. Rotation is prevented, however, inasmuch as the switchhook plungers 3 in their fully lowered position are bearing against the rounded ends of the switchhook 4 thus preventing movement of the rack 7, the pinion gear 8 and the cross shaft 9. It will also be noted in Fig. 5 that the party normal contacts 45 are closed thus completing a circuit to the switchhook contact 52. Also at this point the various subset circuit contacts 30 are aligned so that the dialing signal circuit is opened, the talking circuit is opened and the ringing circuit is closed.

Figures 6, 7:
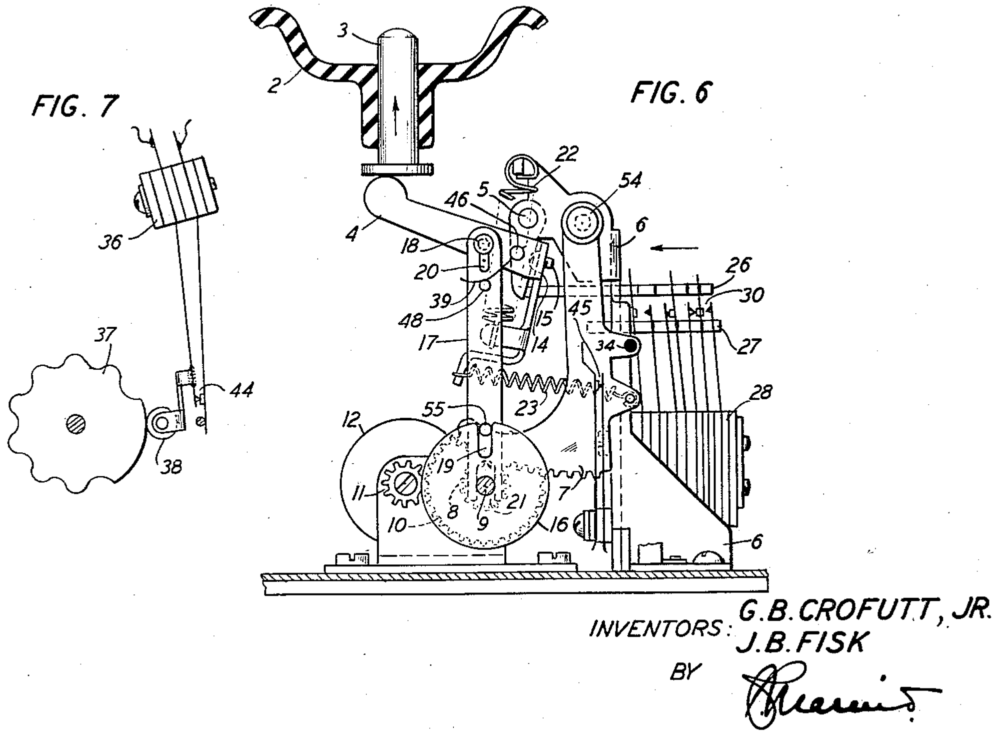
Fig. 6 is similar to Fig. 1 with the exception that the pulse transmitter is omitted in order to illustrate more clearly the position of the gears and linkages in the off-hook state.
Fig. 7 is a cam driven set of station identifying pulse contacts which, in certain applications explained in detail below, may be more advantageous than the magnetically driven sealed reed contacts.

The action which takes place upon the raising of the handset 35 from the cradle 2 is illustrated in Fig. 6. The switchhook plungers 3 are freed for upward movement and are forced upward by the upward swing of the switchhook 4 pulled by the force of the spring 22. Subset contacts 30 are caused to operate by the movement of the movable card 26, noted hereinbefore as being directly connected with the switchhook yoke 14. Of particular note is the fact that these contacts are made to operate before the pulsing wheel 24 is allowed to rotate. This delaying action is brought about by the restraining force of the cam follower pin 55 bearing against the inner portion of the slot 19 in the latch cam 16 as the switchhook 4 raises and in turn raises the slotted link 17. By the time the cam follower pin 55 of the slotted link 17 has reached the outer edge of the latch cam 16, the contacts 30 have been operated to bring about proper circuit alignment. It will be noted, however, that at this point the subset circuits are still short-circuited, as explained hereinbefore, by a path which extends from one side of the line through the party normal contacts 45, the spring contacts 51 and 52, the dial pulsing contacts 47 and the party pulsing contacts 31, to the other side of the line, as shown in Fig. 4. This circuit alignment has the advantage of protecting the calling subscriber's receiver from what would otherwise be an annoying series of clicks from the outgoing pulses and the further advantage of insuring stronger outgoing pulses by by-passing the resistance, in the order of 1000 ohms, of the other subset circuits.

The upward travel of the switchhook 4 is terminated when the switchhook yoke 14 is brought to bear against the bracket 6. The associated movement of the swinging rack 7 and the pulsing wheel 24 is terminated when the swinging rack 7 meets the adjusting screw 15. The rotation of the governor is also terminated at approximately this point except that a slight overrun of the governor is permitted in order to bring about a smooth stopping of the governor. This action is made possible through the functioning of the spring clutch 13 since the clutch spring, loosened during rotation, will allow the governor to rotate independently from the spur gear 11.

One further action takes place approximately at the end of rack 7 travel when going from the on-hook to the off-hook position. The lug 34 on the rack 7 breaks the party normal contacts 45, opening the short-circuiting path across the subset circuits, which occurs slightly after the transmission of the final party identification pulse.

An alternate method of controlling the party identifying pulse circuit has been employed successfully, and in certain subset designs with different space considerations than the subset employed as an embodiment herein, may prove to be more advantageous than the method described above. This method comprises the simple expedient of securing a small wedge of phenolic or other insulating material on the leading edge of the lower portion of the swinging rack 7 and mounting spring contacts on the subset base in such a position that the insulated point of the swinging rack 7 will spread the contacts at the completion of its travel and thus open the short-circuiting path across the subset circuits immediately after the identifying pulses have been transmitted.

One of the requirements in the design of a party pulsing mechanism, in order to make it compatible with central office electronic switching, is that the first pulse must not occur until the elapse of some brief period, for example slightly in excess of 100 milliseconds, after the initial line closure. This delay in sending the pulses is obtained, if the pulsing magnets are located sufficiently close together, by placing three adjacent magnets, starting at the normal position, with like magnetic poles similarly disposed, and arranging the remaining magnets for pulsing with their poles alternating. This arrangement is illustrated in Fig. 1. As the pulsing wheel 24 rotates the pulsing contacts 31 will remain closed as the two magnets 40 and 41, poled in the same direction as the magnet 42 at the normal position, revolve past the sealed reed switch 31 and will open and then close for the following magnet 43 which is poled in the opposite direction. This particular arrangement requires three magnets to send one pulse, four magnets to send three pulses and ten magnets to send eight pulses. Adjacent magnets in the case illustrated are mounted radially on the pulsing wheel 24 at 36-degree intervals.

If the tension on the springs 22 and 23 and the governor 12 are adjusted to provide a pulsing rate of about 20 pulses per second, the arrangement disclosed will provide somewhat over 100 milliseconds between line closure and the first party identification pulse, with a total time of about .6 second elapsing between receiver off-hook and the time dialing can start without interference.

It will be appreciated that although a particular arrangement of the permanent magnets 25 on the pulsing wheel 24 has been illustrated, one of the features of the invention is the complete flexibility with which the station identifying pulse code may be changed. Each of the permanent magnets 25 is removably fitted into a radial slot on the face of the pulsing wheel 24. The pole direction of any magnet and hence the identifying pulse code may be changed quickly and easily by removing the magnet from its slot and reinserting it in a reverse direction.

Tests have shown also that a pulse wheel arrangement with a total of eight magnets with the poles alternating and spaced 45 degrees apart will produce eight clean pulses within a pulsing time of about 250 milliseconds, corresponding to a pulsing rate of about 30 pulses per second. In that instance the interval between line closure and the start of the first pulse was about 35 milliseconds. Tests also demonstrated that the interval between line closure and the start of the first pulse could be increased to about 130 milliseconds by facing the magnetic poles of the first three magnets in the same direction. This distribution of magnets produces a total of six identifying pulses. It is of course apparent that a wide latitude in the number of pulses and in the timing of pulses is made available without departing from the principles of the invention.

The specific pulsing arrangement described above and illustrated by the attached figures employing a magnetically operated sealed reed switch is especially advantageous when used for certain subset models in which the handset is of a particularly light construction. In such arrangements very little energy is available for setting the pulsing mechanism when the handset is placed in the subset cradle. Use of the magnetically operated sealed reed switch minimizes the energy required for pulsing. In other embodiments of the invention, including subsets which make available a relatively greater amount of energy for setting the pulsing mechanism, a somewhat different arrangement, still within the scope of the principles of the invention, is possible. One such arrangement is illustrated by Fig. 7 in which a lobed pulsing cam 37 replaces the pulsing wheel 24 of Fig. 1 and spring pulsing contacts 44 mounted in spring pileup 36 are made to operate through the action of the cam follower 38.

A schematic diagram of the circuitry of a transistorized subset as an embodiment of the features of the invention, as shown in Fig. 4, is illustrative of the ease with which the principles of the invention may be employed to supply station identifying pulses in one of the newer types of subset arrangements. The arrangement shown is also designed to meet the system requirements of a particular central office electronic switching system. Detailed discussion of the features of the subset circuitry shown in Fig. 4 are not presented herein inasmuch as they form no part of the present invention. To those skilled in the art, however, it will be apparent that the speech circuit used is a conventional anti-sidetone circuit employing a class A transistor amplifier 53 with grounded base. A certain amount of loop equalization is provided for in both sending and receiving.

The tone ringer or telecaller circuit employs a class A grounded emitter amplifier 50 with a diode regulated base bias. It will also be noted that the tone ringer circuit is equipped with a frequency selective circuit which is designed to respond to the particular frequency assigned to designate the subscriber. The selected tone is radiated by the tone ringer 33.

The party identification pulse circuit may be traced by following the path from the negative side of the subset subscriber line terminals 49 through the contacts of the sealed switch 31, through the dial pulse contacts 47 through contacts 51 and 52, which will be closed immediately upon the raising of the switchhook to the off-hook position, and back through the party normal contacts 45 to the positive side of the line. It will be recalled that the delay mechanism comprising the cam 16, the slotted link 17 and the slotted link cam follower pin 55 shown in Fig. 6, maintains the party off-normal contacts 45 in the make position until the transmission of the identifying pulses has been completed.

Although the invention has been described in its relation to specific embodiments, it should not be deemed limited to the embodiments illustrated since numerous other embodiments and modifications will readily occur to one skilled in the art without departing from the spirit or scope of the invention.

What is claimed is:

1. In a telephone subscriber's subset including subscriber's line terminals, an auxiliary impulse transmitter comprising a member manually movable in response to the initiation of a call, contacts controlled by said member for closing electrical circuit paths between said subscriber's line terminals, a rotatable member, spring actuated means for rotating said rotatable member, mechanical delay means actuated by said manually movable member for releasing said rotatable member after the operation of certain of said contacts, a plurality of permanent magnets supported on said rotatable member, and a pulsing contact located adjacent said rotatable member interconnected with said subscriber's line terminals.

2. In a telephone subscriber's subset including subscriber's line terminals, a member manually movable in response to the initiation of a call, a first set of contacts controlled by said manually movable member, said contacts controlling ringing circuits, dial operated signaling circuits and talking circuits between said line terminals, a second set of contacts controlled by said manually movable member, said contacts controlling a station identifying signaling path between said line terminals, an auxiliary impulse transmitter controlled by said manually movable member, mechanical delay means interposed between the operation of said first set of contacts and the operation of said auxiliary impulse transmitter and a second mechanical delay means interposed between the operation of said auxiliary pulse transmitter and the operation of said second set of contacts.

3. In a telephone subscriber's subset including subscriber's line terminals, a party line station identification system comprising a switchhook, rotatable means driven by said switchhook, spring means loaded by the force of said switchhook being placed in the on-hook position, a plurality of permanent magnets supported on said rotatable means, a pulsing contact responsive to the movement of said permanent magnets located adjacent said rotatable means, a first set of subset circuit contacts controlled by said switchhook, a second set of subset circuit contacts controlled by said switchhook, mechanical delay means interposed between the operation of said first set of subset circuit contacts and the operation of said pulsing contacts and a second mechanical delay means interposed between the operation of said pulsing contacts and the operation of said second set of subset circuit contacts.

4. In a telephone subscriber's subset including subscriber's line terminals, a party line station identification system comprising a switchhook, mechanical connective means including spring means responsive to the movement of said switchhook, a rotatable shaft responsive to the movement of said connective means, a first set of subset circuit contacts controlled by said switchhook, a second set of subset contacts controlled by said mechanical connective means, a plurality of permanent magnets responsive to the rotation of said rotatable shaft, a set of pulsing contacts responsive to the movement of said permanent magnets, mechanical delay means interposed between the operation of said first set of subset circuit contacts and the rotation of said rotatable shaft and a second mechanical delay means interposed between the rotation of said rotatable shaft and the operation of said second set of subset circuit contacts.

5. In a telephone subscriber's subset including subscriber's line terminals, a party line station identification system comprising a member manually movable in response the initiation of a call, rotatable means responsive to the movement of said manually movable member, a plurality of permanent magnets radially mounted on said rotatable means, pulsing contacts in spaced relation to said permanent magnets and responsive to the movement of said magnets, mechanical governor means controlling the speed of rotation of said rotatable shaft, a first set of subset circuit contacts controlled by said manually movable member, a second set of subset circuit contacts controlled by said manually movable member and mechanical delay means controlling the sequence of the operation of said first set of subset contacts, said pulsing contacts and said second set of subset contacts.

6. In a telephone subscriber's subset including subscriber's line terminals, a party line station identification system comprising a member manually movable in response to the initiation of a call, rotatable means responsive to the movement of said manually movable member, a plurality of permanent magnets radially mounted on said rotatable means, pulsing contacts in spaced relation to said permanent magnets responsive to the movement of said magnets and interconnected with said subscriber's line terminals, mechanical governor means controlling the speed of rotation of said rotatable shaft, mechanical clutch means interposed between said governor means and said rotatable means, a set of subset circuit contacts interconnected with said subscriber's line terminals and controlled by said manually movable member and cam operated means controlled by said manually movable member to effect a predetermined delay between the operation of said subset circuit contacts and said pulsing contacts.

7. In a telephone subscriber's subset including subscriber's line terminals, a party line station identification system comprising a switchhook, a rotatable shaft responsive to the movement of said switchhook, a disc member axially mounted on said rotatable shaft, a plurality of permanent magnets in radial relation to said disc and detachably mounted on said disc, and pulsing contacts located adjacent said disc and interconnected with said subscriber's line terminals.

8. In a telephone subscriber's subset including subscriber's line terminals, a party line station identification system comprising a bracket, a switchhook pivotally supported by said bracket, a gear rack pivotally supported by said bracket, spring means interconnecting said switchhook and said gear rack, a rotatable shaft responsive to the movement of said gear rack, a disc member integrally mounted on said rotatable shaft, a plurality of permanent magnets detachably supported by said disc member and in radial relation to said disc member, pulsing contacts located adjacent said disc member and interconnected with said subscriber's line terminals, a first set of subset circuit contacts directly controlled by the movement of said switchhook, a second set of subset circuit contacts directly controlled by the movement of said gear rack, cam means supported by said rotatable shaft, a mechanical linkage supported by said switchhook, said linkage acting in cooperative relation with said cam means to effect the operation of said first set of subset contacts prior to the operation of said pulsing contacts when the switchhook moves from its on-hook to its off-hook position.

9. In a telephone subscriber's subset including subscriber's line terminals, a party line station identification system comprising a member manually movable in response to the initiation of a call, a plurality of permanent magnets, rotatable supporting means for said magnets, means for manually reversing the pole direction of said magnets to conform to a predetermined pulse code selection, pulsing contacts located adjacent said magnets, mechanical linkage means including spring means establishing mechanical connection between said manually movable member and said rotatable supporting means, governor means controlling the speed of rotation of said rotatable supporting means and clutch means interposed between said governor means and said rotatable supporting means.

10. In a telephone subscriber's subset including subscriber's line terminals, a party line station identification system comprising a switchhook, a rotatable member responsive to the movement of said switchhook, a plurality of permanent magnets detachably supported in a radial substantially coplanar relation by said rotatable member, pulsing contacts adjacent said permanent magnets and responsive to the movement of said magnets, mechanical linkage means including spring means establishing mechanical connection between said manually movable member and said rotatable member, governor means controlling the speed of rotation of said rotatable member, clutch means interposed between said governor means and said rotatable member, a plurality of subset circuit contacts, cam means driven by said rotatable member, and cam follower means supported by said mechanical linkage, said cam means and said cam follower means effecting a delay between the operation of said subset circuit contacts and the operation of said pulsing contacts.

11. In a telephone subscriber's subset including subscriber's line terminals, a party line station identification system comprising a member manually movable in response to the initiation of a call, subset circuit contacts controlled by said member for closing electrical circuit paths between said subscriber's line terminals, pulsing contacts interconnected with said subscriber's line terminals, cam means actuated by said manually movable member for operating said pulsing contacts and mechanical delay means actuated by said manually movable member for controlling the sequence of operation of said circuit contacts and said pulsing contacts.

12. In a telephone subscriber's subset including subscriber's line terminals, a party line station identification system comprising a member manually movable in response to the initiation of a call, subset circuit contacts controlled by said manually movable member for closing electrical circuit paths between said subscriber's line terminals, pulsing contacts interconnected with said subscriber's line terminals, magnetic means controlling the operation of said pulsing contacts, means for setting a predetermined pulse code, and means for setting a predetermined pulse rate.

No references cited.